Feb. 15, 1955 E. E. DRUMM 2,702,337
THERMOSTATICALLY CONTROLLED ELECTRIC PERCOLATOR
Filed Aug. 24, 1950 2 Sheets-Sheet 1
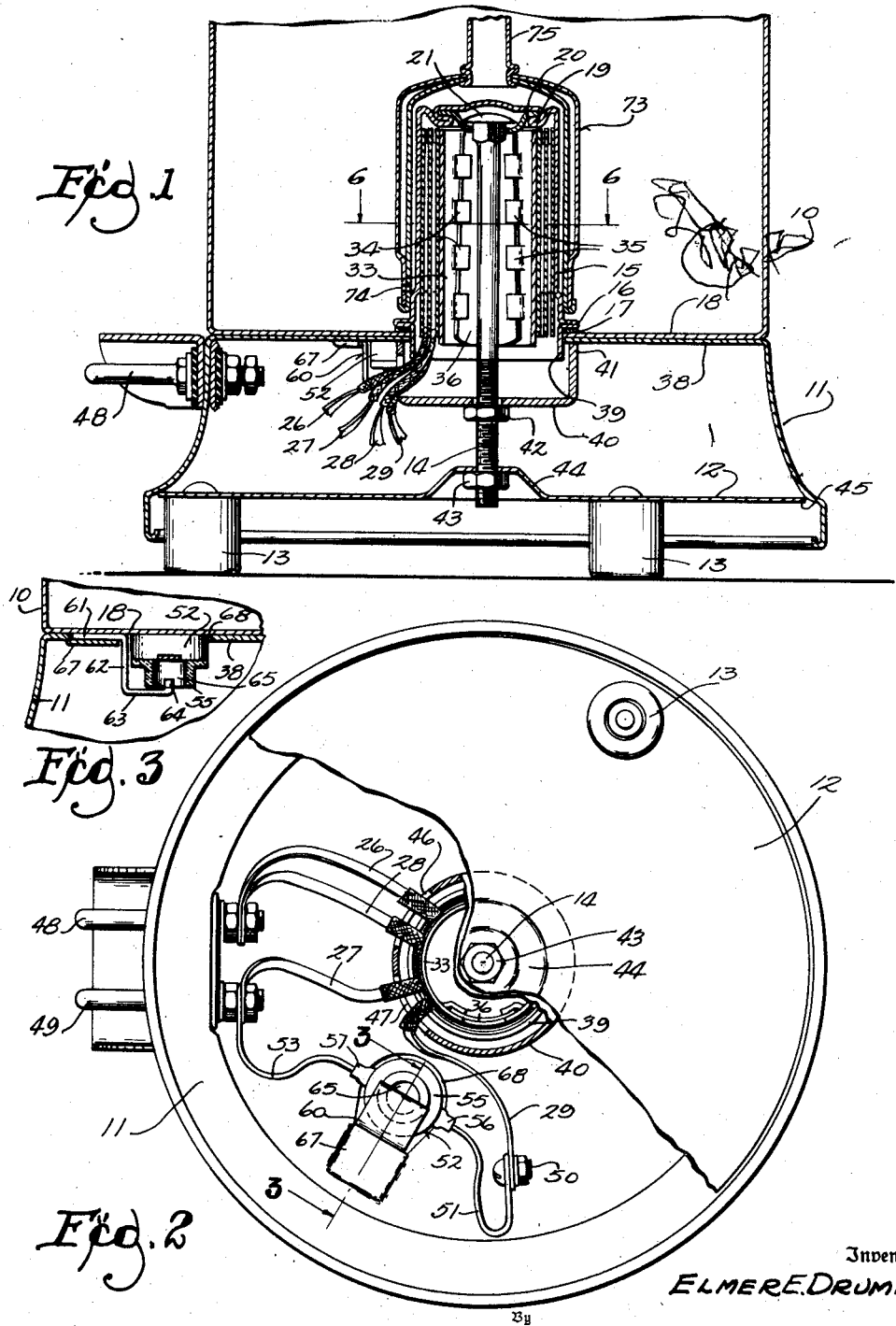
Inventor
ELMER E. DRUMM
By
Wheeler, Wheeler & Wheeler
Attorneys Feb. 15, 1955

E. E. DRUMM 2,702,337

THERMOSTATICALLY CONTROLLED ELECTRIC PERCOLATOR

Filed Aug. 24, 1950

Inventor
ELMER E. DRUMM

By
Wheeler, Wheeler & Wheeler
Attorneys

# United States Patent Office 2,702,337
Patented Feb. 15, 1955

2,702,337
THERMOSTATICALLY CONTROLLED ELECTRIC PERCOLATOR

Elmer E. Drumm, Manitowoc, Wis.

Application August 24, 1950, Serial No. 181,175

11 Claims. (Cl. 219—44)

This invention relates to an assembly of the base and pot and electrical components of a thermostatically-controlled electric percolator.

The invention is concerned particularly with the manner in which the taps of separate electrical resistances are connected to the terminals and the thermostat. The invention is also concerned with the provision for mechanical anchorage of the thermostat to facilitate assembly, such anchorage being effected under pressure between the base and the pot.

In the drawings:

Fig. 1 is a fragmentary view in axial vertical cross section through the lower portion of an electric percolator embodying the invention.

Fig. 2 is an inverted plan view of the percolator, with portions of the bottom closure broken away to expose the thermostat and its mounting and the taps connecting the heating resistances with the terminals.

Fig. 3 is a fragmentary detail view taken in section on the line 3—3 of Fig. 2.

Figure 4:
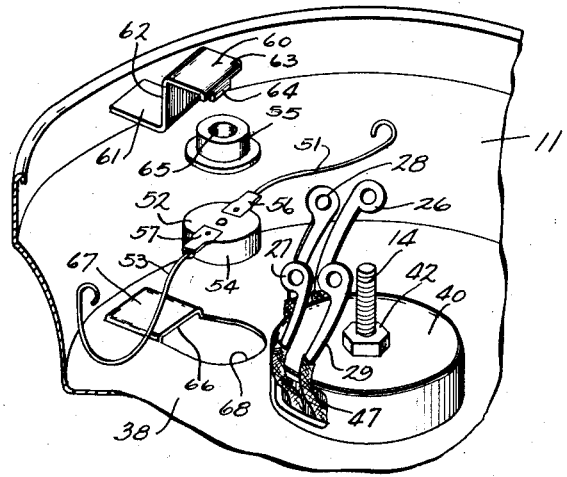
Fig. 4 is a fragmentary detail view in perspective showing the unconnected heating element taps and showing the thermostat and its mounting bracket disassociated from the percolator.

The percolator comprises a conventional pot 10 connected with, and resting upon, a flaring canopy type base 11 having a bottom closure 12 provided with legs 13.

The bolt 14, connected with the heating element can to be supported from the pot 10, is used to connect the pot with the base and bottom closure in the manner hereinafter to be described.

The heater comprises a can 15 having near its open lower end an integral outstanding fold which provides a flange 16 seated upon a gasket 17 to hold the gasket in thrust engagement with the interior bottom surface of the pot 10.

Figure 5:
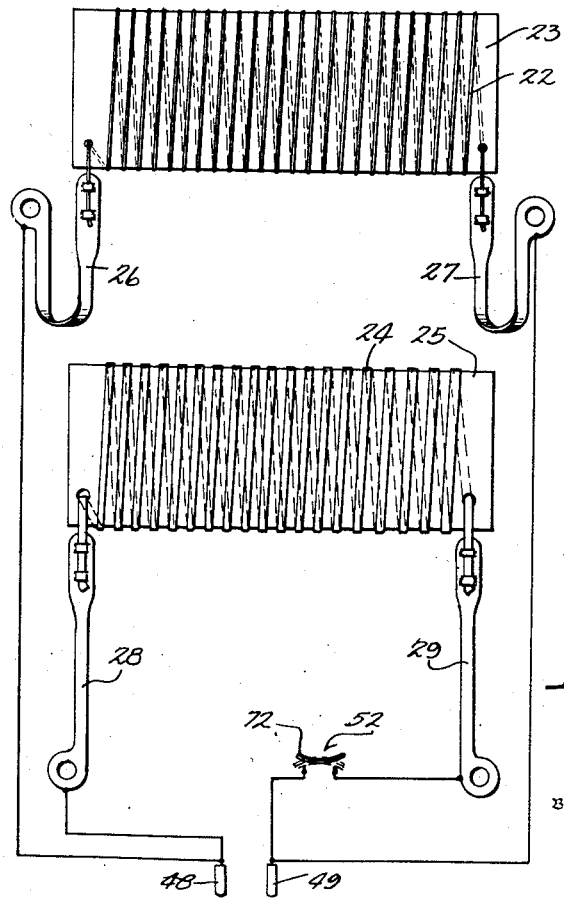
Fig. 5 is a detail view showing the respective heating resistances as they appear before being wound together for incorporation in the heating element, the resistances being show diagrammatically in circuit connection as used in the percolator.

The top of the can is integrally formed to provide the inwardly extending bead at 19 which is upset beneath a washer 20 which encircles bolt 14 and confines the bolt head 21 between the washer and the top of the can 15. Within the can are confined the rolled-up resistance elements shown in Figs. 5 and 6.

Figure 6:
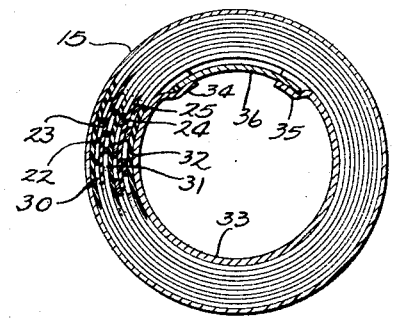
Fig. 6 is an enlarged detail view taken through the heating element on the line 6—6 of Fig. 1.

The resistance wire 22 is wound upon a sheet of mica or other suitable heat resisting dielectric material which is marked 23. A heavier resistance ribbon 24 is wound upon a similar dielectric and heat resistant support 25. The taps or leads 26, 27 are connected to the two ends of the resistance wire 22, and the taps or leads 28, 29 are connected to the ends of the resistance ribbon 24. The two resistance elements thus constituted are insulated from each other and from the metal can 15 and from an inner expander hereinafter to be described by additional sheets of mica or other heat-resisting dielectric, these being identified in Fig. 6 by reference characters 30, 31 and 32. The assembly is then inserted in a cylindrical roll into can 15 and anchored therein by the expansion of a split sleeve 33 which, as shown in Fig. 1 and Fig. 6, is provided along its free margins with inwardly offset tongues at 34 and 35 which are disposed along lines that progressively approach each other toward the upper margin of the split sleeve. When the arcuately cross-sectioned wedge 36 is inserted between the several tongues as shown in Figs. 1 and 6, and is driven home, its upwardly converging side surfaces expand the split sleeve 33 to firmly anchor the heating elements within the can.

The canopy portion 11 of the base upon which pot 10 is mounted has a horizontal wall 38 immediately below the bottom 18 of the pot. This wall, like the pot bottom, is apertured to receive the lower end portion 39 of the heating element can 15. The can acts like a dowel to keep the base canopy and the pot in accurate registration.

It is desirable that the annular canopy member 11 be held to the pot around its inner periphery as well as its outer periphery. A cup-shaped member 40 pierced to pass the bolt 14, has its margin 41 engaged with the wall 38 in immediate proximity to the can and in opposition to the flange 16 of the can whereby the registering margins of the pot bottom and the wall 38 are clamped between flange 16 and margin 41 of member 40, said member being thrust upwardly by the nut 42 which is threaded to bolt 14 as shown in Fig. 1.

A second nut at 43, also threaded on bolt 14, engages the recessed portion 44 of the bottom closure 12 to urge the bottom closure upwardly, its margins 45 seating within the flaring wall portion of canopy 11 and thus transmitting upward thrust to the canopy to hold the outer margins of wall 38 firmly seated against the pot bottom 18.

The cup-shaped member 40 has suitable lateral openings 46 and 47 through which the terminal leads of the heating elements issue as best shown in Figs. 2 and 4.

The leads 26 and 28 are both connected to the conventional terminal post 48, while the lead 27 is connected to the terminal post 49 and lead 29 is secured by the connecting bolt 50 with the lead 51 of a generally conventional thermostat button 52. The other lead 53 from the thermostat button extends to the post 49, to which it is connected along with lead 27 from resistance wire 22.

The thermostat 52 is of a commercially-known type having a porcelain shell 54 to which the leads 51 and 53 are mechanically connected by means of rivets as shown in Fig. 4, which also serve to transmit current through the thermostat between their respective leads. With this particular thermostat, it is desirable to provide safe mounting through the use of a thimble 55 (Fig. 4) which covers the terminal portions 56 and 57 of the leads 51 and 53 to preclude the possibility of their being shorted by the mounting bracket 60. This bracket comprises a Z-shaped stamping having a horizontal leg 61, a vertical intermediate web 62, a horizontal leg 63 and a finger 64, the latter being engaged in the central orifice 65 of the insulating thimble 55.

The leg 61 of the mounting bracket 60 is received within a pocket 66 which is formed between the wall 38 of the canopy member 11 and the pot bottom. Since it is desired to leave the pot bottom smooth, this pocket is most conveniently made by deforming downwardly the portion 67 of wall 38 which lies immediately adjacent the aperture 68 in such wall. The thermostat 54 fits within aperture 68 against the bottom 18 of the pot and is held there by the bracket 60 which exerts upward thrust upon the thermostat through the intervening thimble 55. The bracket thrust is derived from the horizontal wall 38 of the canopy, and the security of the assembly is assured by the fact that such wall is held to the pot both at its inner periphery, and at its outer periphery, by the means already described.

Figure 7:
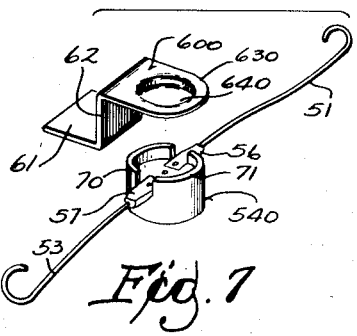
Fig. 7 is a detail view showing in perspective and in relatively separated positions a slightly modified thermostat and bracket.
Figure 8:
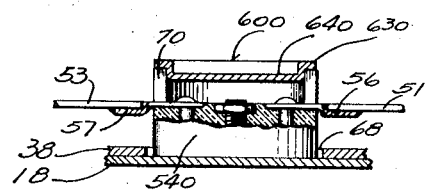
Fig. 8 is an enlarged detail view in transverse section through the assembled bracket and thermostat of the type shown in Fig. 7.

As shown in Figs. 7 and 8, the thimble 55 can be dispensed with by providing the thermostat 540 with upwardly extending and mutually spaced arcuately peripheral walls 70 and 71, these walls being adapted to pass between them the terminal leads 56 and 57 of the thermostat as already described. The bracket 600 has the same horizontal leg 61 as the bracket 60 and the same vertical leg 62. However, its lower horizontal leg 630 is extended horizontally to dispense with the positioning finger above described and to substitute an upwardly projecting boss at 640 which seats between the walls 70 and 71 to securely position the thermostat in the aperture 68, just as above described.

The heating elements comprising resistance wire 22 and resistance ribbon 24 have different functions. Reference to the circuit connections diagrammatically illustrated in Fig. 5 and physically shown in Fig. 2 will show that the resistance wire 22 is connected at all times, irrespective of the opening and closing of the contact 72 of thermostat 52. Only the resistance element 24 is subject to control by the thermostat.

The heavier ribbon used in resistance element 24 enables this heating element to handle considerably more wattage and to develop considerable more heat than resistance element 22. Both elements operate in unison to cause the initial percolation and to bring the beverage in the pot 10 up to a temperature close to its boiling point.

While the principle of percolator operation is well-known in the art, a brief description thereof may be helpful. The can 15 which constitutes the outside of the heater is enveloped in a double-walled chamber 73 which fits closely about the bottom of the can, but has one or more small orifices 74 which admit into its interior, and into contact with can 15, the water or beverage in pot 10. The double wall of chamber 73 thermally insulates the body of liquid in the pot from the relatively small portion of such liquid which enters the heating chamber. Consequently, steam soon forms within the heating chamber and elevates a portion of the liquid therein through the vertical tube 75, from which it escapes to run over the material from which the beverage is to be steeped.

This operation continues for quite a period of time before the body of liquid outside of the heating chamber has its temperature raised into proximity to the boiling point. Ultimately, by reason of heat radiating from the chamber 73 and by reason of the return of the liquid to the pot from the chamber, the body of liquid outside the chamber reaches a temperature at which the thermostat 52 is set to react.

Since the thermostat is securely held against the bottom of the pot, it will be sensitive to the temperature of liquid therein, and, when such liquid reaches the set temperature, the thermostat contact 72 will open to break the circuit through the heating element 24.

The circuit through the heating element 22 will continue effective, and the characteristics of this heating element are so chosen with reference to the capacity of the pot in which it is used and to the characteristics of the thermostat 52 that the heating element 22 will tend to maintain the contents of the pot adequately heated, without allowing such contents to be raised to the boiling point on the one hand, and without allowing the contents to fall, on the other hand, to the point where the thermostat will again close the circuit to heating element 24.

In other words, it is not desired to renew the percolating action, once percolation has terminated. The thermostat chosen is one, therefore, which has a relatively wide range between the temperature at which it opens and the temperature at which it re-closes. The heating element 22 is alone adapted to maintain the contents of the pot well within the upper and lower limits of that range.

Thus, when the pot is filled with liquid, and an electrical connection is plugged in to the terminal posts 48 and 49, both of the resistance elements 22 and 24 are immediately effective to raise the temperature of the heating element can 15, whereby the liquid confined immediately about the can is raised above the boiling point, and portions thereof are ejected to percolator tube 75. When the body of liquid excluded from the immediate vicinity of the can reaches a temperature approaching the boiling point (which may be about 190° F., for example), the thermostat opens the circuit to the heavier resistance 24 only, leaving the continued operation of resistance element 22 to maintain the body of liquid in the pot at a temperature which is no greater than that at which the thermostat has opened and which is not so low as the temperature at which the thermostat will re-establish the circuit to the heating element 24. Thus, the beverage will be maintained hot for as long as may be desired without re-commencing percolation.

The mechanical construction of the parts as herein disclosed is such as greatly to facilitate their manufacture and assembly. It will be observed that there is no mechanical or electrical connection between the heating elements 22 and 24 except the parallel connection which is achieved when their respective leads are finally attached to the terminal posts 48 and 49. Thus, although the two resistances are ultimately connected in parallel across these posts, the connection awaits the final assembly operation and hence does not hamper any intervening manipulation of the parts.

The mechanical positioning of the thermostat is such that it assures intimate association under pressure against the bottom of the pot, its pressure engagement being achieved, however, in the final step of tightening the nut 43 to hold the bottom closure 12 to the canopy. This bottom closure is the last part to be applied, since it houses and renders safe all of the electrical connections within the canopy. Until the bottom closure is tightened against the canopy, there is enough movement between the canopy wall 38 and the pot bottom so that the bracket 60 (or 600) and the thermostat retained thereby can readily be manipulated into position. The pocket 67 formed in the wall 38 only loosely engages the bracket with sufficient pressure to hold it in place until the pocket is tightened upon the bracket when the nut 43 tightens the closure 12 upon the canopy.

I claim:

1. The combination with a pot and a canopy base having a wall extending beneath the bottom of the pot and provided with a thermostat-receiving aperture, of a thermostat positioned in the aperture against the bottom of the pot and a bracket engaged with the thermostat and having a portion connected with said wall to be held thereby in a position to press the thermostat against the bottom of the pot, together with a heater comprising an electrical resistance in series with the thermostat, said heater being in operative association with said pot to heat the contents thereof, said bracket comprising an arm disposed between the base and the pot, in further combination with clamping means acting on said base both radially outwardly of the bracket and radially inwardly therefrom to impose substantial resilient bias on said wall and arm to insure good contact between the thermostat and pot bottom.

2. The combination with a pot and a base having a complementary supporting wall in substantial face contact with the bottom of the pot throughout most of the area thereof, said wall and pot bottom having registering openings, a heater comprising a can having an annular flange engaged with the bottom of the pot in the interior of the pot, said can projecting beyond said flange to the openings of the pot bottom and the wall of the base, a bolt connected at its upper end with the can and depending downwardly from the can, an annular cup encircling the bolt and engaging from beneath the said wall of the base, a nut on the bolt in pressure engagement with the cup, a second nut on the bolt at a lower level than the nut first mentioned, a bottom for said base engaged by the second nut and transmitting pressure thereof to the outer periphery of said base whereby to urge the outer periphery of said base into contact with the outer periphery of the pot bottom, the said wall of the base being provided with a pocket recess and an adjacent aperture, a thermostat disposed in the aperture and exposed to the bottom of the pot and a bracket in the pocket recess and provided with a portion extending beneath the thermostat and in pressure engagement therewith toward the pot, at least one heating element within the can and electrical connections thereto in series with said thermostat.

3. The combination with a pot having an apertured bottom and means within the pot suspending a bolt depending through said bottom, of a canopy base having a wall immediately beneath the pot bottom and apertured to pass said bolt, nuts axially spaced on said bolt, inner and outer thrust-transmitting members engaged by the respective nuts and engaged with said canopy at points respectively adjacent to and remote from the outer periphery of the canopy, whereby said canopy wall is urged at radially spaced points toward the bottom of the pot, a bracket having a portion clamped between said canopy wall and the pot bottom, said wall having a second aperture opposite the pot bottom and a thermostat disposed in said second aperture and supported by said bracket in thrust engagement with the pot bottom under the resilient bias of said canopy wall and bracket.

4. The device of claim 3 in which the means within the pot for supporting the bolt comprises a heater can having an internal resistance connected in series with the thermostat.

5. The device of claim 4 in further combination with a second resistance element connected in parallel across said thermostat and first mentioned resistance, the said resistance and resistance elements and thermostat having leads, and said base having electrical terminals with which said leads are directly connected to provide the sole electrical connection between the resistance and resistance elements in the parallel connection aforesaid.

6. The combination with a canopy base having an upper wall provided with a pocket and an adjacent aperture, of a pot mounted on said base and closing said pocket above said wall, a bracket having an arm confined within the pocket and another arm overhanging the aperture, and a thermostat mechanically positioned in the aperture and confined therein by the overhanging arm of the bracket.

7. The device of claim 6 in which said thermostat has exposed electrical connections and a non-conducting thimble intervenes between said thermostat and the overhanging arm of the bracket to transmit bracket thrust to the thermostat while insulating the overhanging arm from said terminals.

8. The device of claim 6 in which said thermostat has upstanding dielectric means between which it is provided with its electrical terminals, the overhanging arm of the bracket having an embossed portion seated upon said dielectric means to position the thermostat.

9. The combination with a pot having a side wall and an annular bottom peripherally joined to the side wall and having a central opening, a central heater can connected with the bottom about the opening, the annular space between the side wall and can comprising a storage chamber, and a base having a wall disposed beneath the bottom wall of the pot, and provided with an aperture radially outside of said percolating can and beneath the storage chamber and exposing the bottom wall of the pot, a thermostat in said aperture, a bracket mounted on said base wall and in supporting engagement with said thermostat, and means for imposing upward thrust on the base wall at radially offset points at both sides of the bracket, whereby said bracket clamps said thermostat against the bottom wall of the storage chamber, together with a heater comprising an electrical resistance disposed in said percolating can and in series connection with the thermostat.

10. The device of claim 9 in further combination with a second electrical resistance connected in parallel across the heater resistance and thermostat aforesaid.

11. The device of claim 10 in which the heater resistance has materially greater wattage than the second resistance, the thermostat having a relatively wide range between its opening temperature and its closing temperature, and the second resistance being adapted to maintain the contents of the pot well within said range.

References Cited in the file of this patent
UNITED STATES PATENTS

| | | |
|---|---|---|
| 1,848,449 | Wiegand | Mar. 8, 1932 |
| 1,944,438 | Larsen | Jan. 23, 1934 |
| 1,956,067 | Herz | Apr. 24, 1934 |
| 1,984,129 | Green | Dec. 11, 1934 |
| 2,067,918 | Harper | Jan. 19, 1937 |
| 2,212,100 | Keaton | Aug. 20, 1940 |
| 2,217,474 | Foster | Oct. 8, 1940 |
| 2,329,116 | Heilman | Sept. 7, 1943 |
| 2,430,196 | Vaughan | Nov. 4, 1947 |
| 2,500,390 | Wales | Mar. 14, 1950 |
| 2,537,167 | Synder | Jan. 9, 1951 |